United States Patent
Chou

(10) Patent No.: US 7,072,668 B2
(45) Date of Patent: Jul. 4, 2006

(54) DURABLE GLOBAL ASSET-TRACKING DEVICE AND A METHOD OF USING THE SAME

(75) Inventor: Y. Hong Chou, Fountain Valley, CA (US)

(73) Assignee: Geospatial Technologies, Inc., Santa Ana, CA (US)

( * ) Notice: Subject to any disclaimer, the term of this patent is extended or adjusted under 35 U.S.C. 154(b) by 332 days.

(21) Appl. No.: 10/152,943

(22) Filed: May 22, 2002

(65) Prior Publication Data

US 2002/0177476 A1 Nov. 28, 2002

Related U.S. Application Data

(60) Provisional application No. 60/292,760, filed on May 22, 2001.

(51) Int. Cl.
*H04Q 7/20* (2006.01)
(52) U.S. Cl. .............. 455/456.1; 455/456.5; 455/461; 342/357.07
(58) Field of Classification Search ........... 455/404.2, 455/419, 435.3, 456.1–456.5, 456.6, 461; 340/572.1, 373.4; 342/357.07, 357.09
See application file for complete search history.

(56) References Cited

U.S. PATENT DOCUMENTS

| | | | |
|---|---|---|---|
| 4,067,015 A * | 1/1978 | Mogavero et al. ....... 340/825.7 |
| 5,400,020 A | 3/1995 | Jones et al. |
| 5,587,715 A | 12/1996 | Lewis |
| 5,731,757 A * | 3/1998 | Layson, Jr. .............. 340/573.1 |
| 5,809,396 A | 9/1998 | Armbruster et al. |
| 5,825,283 A * | 10/1998 | Camhi ........................ 340/438 |
| 5,841,396 A | 11/1998 | Krasner |
| 5,918,180 A * | 6/1999 | Dimino ..................... 455/456.3 |
| 5,920,821 A | 7/1999 | Seazholtz et al. |
| 5,959,577 A | 9/1999 | Fan et al. |
| 6,049,619 A * | 4/2000 | Anandan et al. ............. 382/107 |
| 6,067,044 A * | 5/2000 | Whelan et al. ........ 342/357.07 |
| 6,088,594 A | 7/2000 | Kingdon et al. |
| 6,091,957 A | 7/2000 | Larkins et al. |
| 6,133,853 A | 10/2000 | Obradovich et al. |
| 6,141,621 A | 10/2000 | Piwowarski et al. |
| 6,177,905 B1 | 1/2001 | Welch |
| 6,185,427 B1 | 2/2001 | Krasner et al. |
| 6,188,956 B1 | 2/2001 | Walters |
| 6,198,390 B1 | 3/2001 | Schlager et al. |
| 6,199,010 B1 | 3/2001 | Richton |
| 6,202,023 B1 | 3/2001 | Hancock et al. |
| 6,212,472 B1 | 4/2001 | Nonaka et al. |
| 6,212,474 B1 | 4/2001 | Fowler et al. |
| 6,222,483 B1 | 4/2001 | Twitchell et al. |

(Continued)

*Primary Examiner*—Simon Nguyen
(74) *Attorney, Agent, or Firm*—Myers Dawes Andras & Sherman LLP; Vic Y. Lin

(57) ABSTRACT

A communication system for tracking an asset globally accesses multiple communication networks and switches among them, choosing the most economic, available communication mode without need for a constant power supply. An integrated motion sensor uses a combination of GPS updating and dynamic movement calculation to obtain the most reliable position estimation. Current location is identified within a small radius at all times. While taking advantage of the GPS system to obtain accurate location information, direct exposure to GPS satellites is not required at all times. The system obtains position information from GPS satellites whenever valid GPS signals are available, and provides its own location tracking capability when GPS signals are not accessible. The position accuracy of the device is preferably within a 20-meter radius from the exact location.

49 Claims, 10 Drawing Sheets

U.S. PATENT DOCUMENTS

| | | |
|---|---|---|
| 6,225,944 B1 | 5/2001 | Hayes |
| 6,226,590 B1 | 5/2001 | Fukaya et al. |
| 6,236,358 B1 * | 5/2001 | Durst et al. ............ 342/357.09 |
| 6,236,365 B1 | 5/2001 | LeBlanc et al. |
| 6,246,882 B1 * | 6/2001 | Lachance ................ 455/456.4 |
| 6,278,936 B1 | 8/2001 | Jones |
| 6,281,797 B1 * | 8/2001 | Forster et al. ........... 340/572.3 |
| 6,314,308 B1 | 11/2001 | Sheynblat et al. |
| 6,317,060 B1 | 11/2001 | Jones |
| 6,327,533 B1 * | 12/2001 | Chou ........................ 701/207 |
| 6,362,778 B1 * | 3/2002 | Neher ................... 342/357.07 |
| 6,388,612 B1 * | 5/2002 | Neher ................... 342/357.07 |
| 6,700,533 B1 * | 3/2004 | Werb et al. ........... 342/357.07 |
| 6,799,049 B1 * | 9/2004 | Zellner et al. ........... 455/456.1 |
| 2004/0145520 A1 * | 7/2004 | Richardson et al. ... 342/357.07 |

* cited by examiner

DURABLE GLOBAL ASSET-TRACKING DEVICE AND A METHOD OF USING THE SAME

RELATED APPLICATIONS

This application relates to and claims priority from U.S. Provisional Application Ser. No. 60/292,760 entitled GST-TRAX: A DURABLE GLOBAL ASSET-TRACKING DEVICE filed on May 22, 2001, which is incorporated herein by reference as if fully set forth.

BACKGROUND OF THE INVENTION

1. Field of the Invention

This invention relates to the field of electronic devices, which can be used to provide asset-tracking capability with global coverage for an extensive period of time.

2. Description of the Prior Art

Existing systems for asset tracking lack the capability required for long duration, global coverage due to several serious shortcomings. First, currently each asset-tracking device must be connected either to a battery, such as the battery of a vehicle, or an external power source such as the cigarette lighter adapter or an AC power supply. For asset tracking at the global scale, a battery connection or a direct AC power supply may not be always available and thus the power source becomes a major problem and limitation.

Some assets to be tracked may be in transit for an extended period of time. A device installed on such assets would require extensive duration since external power may be unavailable. For example, containers that are shipped overseas may need to run on internal batteries for two months or even longer. Simply adding batteries to an existing pack is not an ideal solution for durable tracking since this would enlarge the pack to an undesirable, bulky size.

Second, another major limitation of existing GPS tracking systems is the need to have an external GPS antenna with "Line of Sight" access to GPS satellites. For vehicle tracking, this may not be a major concern since vehicles primarily run on the surface of the earth with sufficient sky exposure. For tracking assets such as containers, it may not be possible to ensure reliable, constant satellite exposure. For instance, containers tend to be stacked up one on top of another during shipment. Also, a trailer may be kept inside a covered structure over a long period of time. If GPS data is not available, the location cannot be obtained from the satellites. Current GPS-based tracking systems at best can report the last available GPS reading, which may be beyond any reachable range from the actual current location.

Third, all current GPS-based tracking devices on the market use only one method of wireless communication to transmit location data between the asset and a centralized facility. For example, some tracking-service providers use the CDPD network of AT&T or local cellular networks. A typical problem with the single-network mechanism is that often the device is out of the coverage area of the wireless communication network. Currently, no wireless communication network offers complete global coverage.

BRIEF SUMMARY OF THE INVENTION

In accordance with the present invention, structures and associated methods are disclosed which overcome these deficiencies. In one aspect, a device is provided to sustain the durability of the tracking capability without substantially increasing its size. In another aspect, loss of current GPS positioning can be accommodated. In a further aspect, network connectability is maximized.

An apparatus is provided for globally tracking assets from a central tracking facility comprising a processor module and a location module coupled to the processor module. The location module provides a position accuracy at all times within approximately 20 meter radius of an actual location of the apparatus or the asset to which it is attached or associated. A communication module is coupled to the processor module. The communication module selects the most cost-effective, available mode of communication to the central tracking facility. An antenna module is coupled to the processor module. The antenna module sends and receives signals among a plurality of antennas and corresponding plurality of communication protocols. A power module provides a durable source of power to the apparatus, the power module being coupled to the processor module. Preferably the power module provides unassisted or unreplenished power to the apparatus for at least one year's operation.

The location module comprises a GPS circuit, a dynamic motion sensor to provide position accuracy at all times within approximately 20 meter radius of an actual location of the apparatus by using the GPS circuit when GPS data is available and using the dynamic motion sensor for determining dead-reckoning position when the GPS data is not available. The location module identifies a best position available, and transfers the best position available to the processor module for storage therein. The processor module makes the best position available to all other modules within the apparatus.

When the apparatus is active or powered up, the communication module continuously transfers information pertaining to the most cost-effective, available mode of communication to the processor module.

The power module minimizes power consumption within the apparatus whenever the apparatus is not moving as determined by the location module.

The antenna module comprises a GPS receiver and corresponding GPS antenna, a local RF transceiver and corresponding RF antenna, a cellular network transceiver and cellular antenna, and a satellite transceiver and satellite antenna. The GPS circuit of the location module comprises a GPS engine board for processing GPS data, and where the dynamic motion sensor comprises a three-dimensional gyro and a speed computation processor. The dynamic motion sensor is always maintained in an active state by the power module. The three-dimensional gyro determines motion of the apparatus in three dimensions, and the speed computation processor estimates acceleration or deceleration of the apparatus at all times.

The apparatus further comprising means for initialization a location of the apparatus. In one embodiment, the means for initialization a location of the apparatus comprises a GPS circuit within the location module. In another embodiment, the means for initialization a location of the apparatus comprises a data entry device. In yet another embodiment the means for initialization a location of the apparatus comprises a device for manual entry of latitude and longitude of the apparatus at the time of initialization.

The location module alters the initial location according to direction and displacement sensed by the location module of the apparatus or asset since its initialization to generate an estimated location. The location module also corrects the estimated location whenever a valid GPS signal for the apparatus can be determined by the location module. In another embodiment, it is contemplated that the location module corrects the estimated location whenever a valid RF location signal for the apparatus can be determined by the location module.

The communication module comprises a control circuit coupled to an RF transceiver, to a multi-band radio modem for cellular or digital communications, and to a dedicated modem for satellite communications. The control circuit coordinates and controls the communications through the RF transceiver, multi-band radio modem, and dedicated modem to evaluate validity of communications therethrough, to determine the most cost-effective mode of communication available at each given time and to switch communication to the determined most cost-effective mode of communication. The control circuit preassigns a priority to each mode of communication. In the illustrated embodiment the priority assigned by the control circuit is highest for RF communications, then cellular communications, and lowest for satellite communications. In addition, the priority assigned by the control circuit to cellular communications is assigned to a plurality of cellular networks, each having a corresponding frequency range, protocol and assigned priority level.

In one embodiment the central facility transmits a corresponding frequency range, protocol and assigned priority level for each of the plurality of cellular networks to the apparatus through the communications module.

The power module comprises an external wake-up unit, a high energy-density battery, and a self-recharging unit. The external wake-up unit turns all the modules completely off except for a portion of the location module for sensing movement of the apparatus, and powers up all the modules when the active portion of the location module senses movement of the apparatus. The external wake-up unit further comprises a data receive sensor responsive to commands from the central facility to power up the apparatus on command therefrom.

The self-recharging unit comprises an external recharging source, an internal recharging source, and a solar recharging source. The external recharging source comprises in one embodiment a wind-powered electrical generator. The internal recharging source comprises in one embodiment a motion-powered or pendulum-powered electrical generator. The apparatus further comprises an AC adapter for charging the high energy-density battery.

A system is also provided for globally tracking assets for an extended duration. The system comprises a processor module, a location module coupled to the processor module, the location module comprising a sensor to detect movement of the system, a communication module coupled to the processor module and adapted for communication with a remote tracking facility, an antenna module coupled to the processor module, and a power module coupled to the processor module. The power module is adapted to switch between a sleep mode when the sensor does not detect movement of the system and a wakeup mode when the sensor detects movement of the system.

The power module provides unassisted power to the system for at least one year's operation. When a GPS reading is invalid, the location module provides the asset's position by detecting motion of the asset, preferably using a direction detector and a speed detector. The power module comprises a wakeup unit. The antenna module is adapted for sending and receiving signals among a plurality of antennas and corresponding plurality of communication protocols. The communication module is adapted for selecting the most cost-effective, available mode of communication with the remote tracking facility. Preferably, the communication module selects from an RF mode, a cellular mode and a satellite mode. The communication module assigns a priority to each mode, the priority being highest for the RF mode, the priority being second highest for the cellular mode, and the priority being lowest for the satellite mode.

In a further aspect, a system is provided for globally tracking assets using a multi-mode antenna module. The system comprises a processor module, a location module coupled to the processor module, a communication module coupled to the processor module and adapted for communication to a remote tracking facility, an antenna module coupled to the processor module, the antenna module being adapted for sending and receiving signals among a plurality of antennas and corresponding plurality of communication protocols, and a power module coupled to the processor module. The communication protocols comprise a GPS protocol, an RF protocol, a cellular protocol, and a satellite protocol. The plurality of antennas comprise a GPS antenna, an RF antenna, a cellular antenna, and a satellite antenna.

In another aspect, a system for globally tracking assets comprises a processor module, a location module coupled to the processor module, the location module being adapted for receiving GPS signals and for detecting movement of the system, a communication module coupled to the processor module and adapted for selecting the most cost-effective, available mode of communication with a remote tracking facility, an antenna module coupled to the processor module, and a power module coupled to the processor module. The communication module selects from an RF mode, a cellular mode and a satellite mode. The communication module assigns a priority to each mode, the priority being highest for the RF mode, the priority being second highest for the cellular mode, and the priority being lowest for the satellite mode.

A method is provided which comprises a combination of steps for performing each of the foregoing functions both in general terms and in the recited apparatus in particular. In particular, a method for globally tracking an asset from a central tracking facility comprising the steps of providing a position accuracy at all times within approximately 20 meter radius of an actual location of the asset, selecting the most cost-effective, available mode of communication to the central tracking facility and sending and receiving signals among a plurality of communications modes and corresponding plurality of communication protocols.

The method further comprises the steps of providing a durable source of power to the asset and providing unassisted power to the asset for at least one year's operation.

Providing a position accuracy at all times within approximately 20 meter radius of an actual location of the asset comprises the steps of using GPS signals when GPS data is available and using local dynamic motion sensing for determining dead-reckoning position when the GPS data is not available. The method further comprises the steps of identifying a best position available, transferring the best position available to a processor module for storage therein and making the best position available to all other modules within the asset. When the asset is active, the method further comprises the step of continuously determining the most cost-effective, then available mode of communication. Power consumption within the asset is minimized whenever the asset is not moving.

The step of sending and receiving signals among a plurality of communications modes and corresponding plurality of communication protocols comprises the steps of sending and receiving GPS signals, local RF signals, cellular network signals, and satellite signals. Local dynamic motion sensing comprises the steps of using three-dimensional gyroscopic direction sensing in combination with acceleration and deceleration sensing to compute the dead-reckoning position when the GPS data is not available. Dynamic motion sensing is performed at all times and is never powered down. The steps of using three-dimensional gyroscopic direction sensing in combination with acceleration and deceleration sensing to compute the dead-reckoning position is performed at all times.

The method further comprises the step of initialization a location of the asset which may comprise the steps of using GPS signals and GPS processing, inputting the location through a data entry device, or manually entering the latitude and longitude of the asset at the time of initialization. The method further comprises the step of altering the initial location according to a sensed direction and displacement of the asset since its initialization to generate an estimated location. The method further comprises the step of correcting the estimated location whenever a valid GPS signal for the asset can be determined. The method further comprises the step of correcting the estimated location whenever a valid RF location signal for the asset can be determined.

The step of sending and receiving signals among a plurality of communications modes and corresponding plurality of communication protocols comprises the steps of sending and receiving RF signals, cellular or digital multiband radio modem signals, and satellite modem signals according to the validity of communications, and the most cost-effective mode of communication available at each given time. A priority is preassigned to each mode of communication. The step of preassigning a priority to each mode of communication assigns the highest priority for RF communications, then cellular communications, and the lowest priority for satellite communications. The step of preassigning a priority to cellular communications assigns priority to a plurality of cellular networks, each having a corresponding frequency range, protocol and assigned priority level. The central facility transmits a corresponding frequency range, protocol and assigned priority level for each of the plurality of cellular networks to the asset. Providing a durable source of power to the asset comprises providing an external wake-up unit, a high energy-density battery, and a self-recharging unit.

The method further comprises the step of externally terminating all functions in the asset except for sensing movement of the asset, and activating all functions in the asset when movement of the asset is sensed. The method further comprises the step of externally activating all functions with the asset in response to commands received by the asset from the central facility. The method further comprises the steps of recharging the battery by means of an external recharging source, an internal recharging source, and a solar recharging source. Recharging the battery by means of the external recharging source comprises recharging the battery by means of a wind-powered electrical generator, by means of a motion-powered or pendulum activated electrical generator, or by means of an AC adapter.

While the apparatus and method may be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112.

The invention can be better visualized by turning now to the following drawings wherein like elements are referenced by like numerals.

Figure 1:
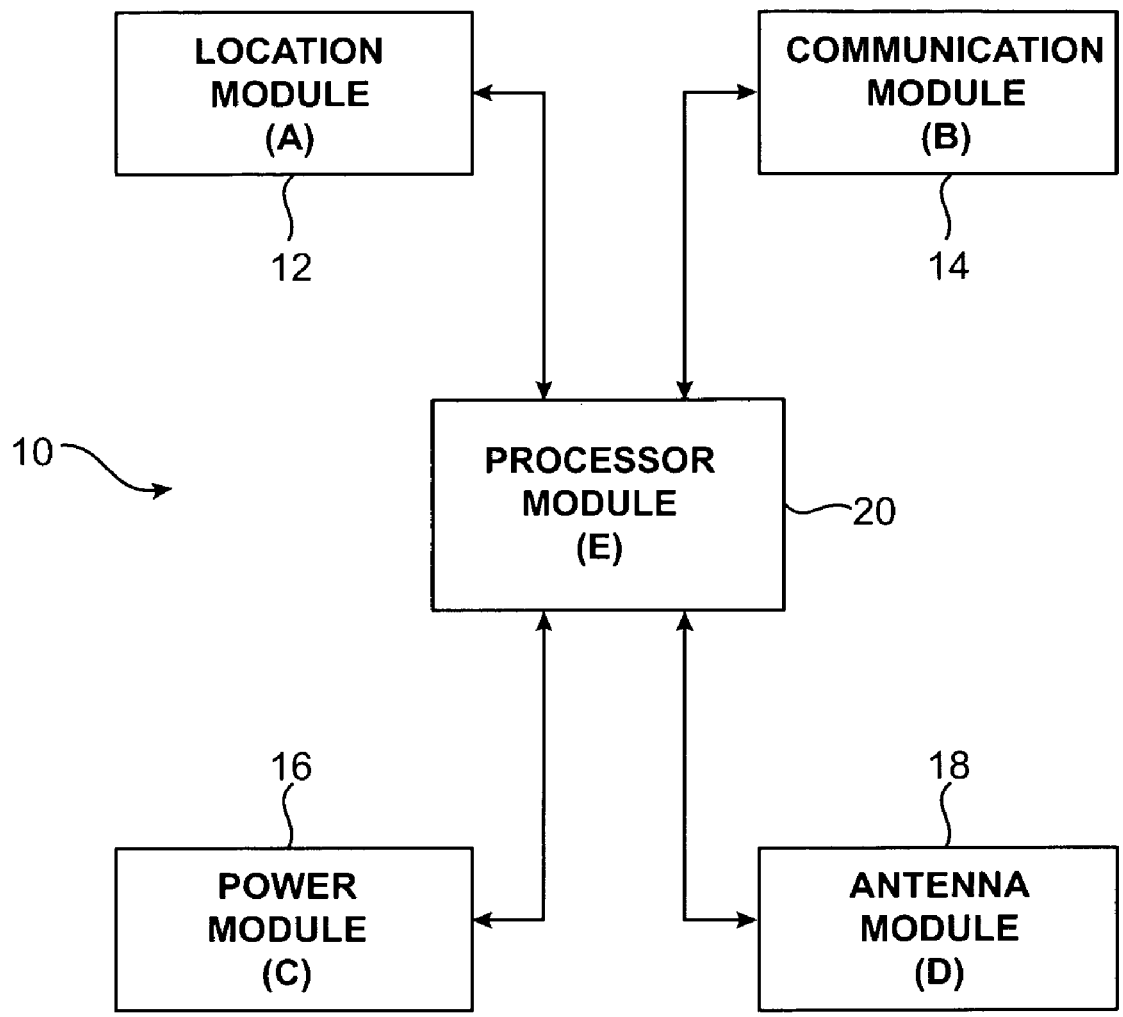
FIG. 1 is a simplified block diagram of the major modules of a preferred embodiment of a system according to the invention.

The invention and its various embodiments can now be better understood by turning to the following detailed description of the preferred embodiments which are presented as illustrated examples of the invention defined in the claims. It is expressly understood that the invention as defined by the claims may be broader than the illustrated embodiments described below.

DETAILED DESCRIPTION OF THE PREFERRED EMBODIMENTS

The Advantages over the Prior Art

In the Figures, a preferred embodiment of a system, or device, according to the invention sustains the durability of tracking capability without substantially increasing the size of the device. Also disclosed is a communication methodology whereby multiple networks are globally accessed. For example, GST uses GSM in Europe and Asia, and Mobitex of Cingular in the United States. Also disclosed is a communication module for switching among multiple communication modes, and always choosing the available and most economic mode to transmit location data.

A motion sensor is integrated into the tracking device and introduces a combination of GPS updating and dynamic movement calculation to obtain the most reliable position estimation at all times. With this apparatus, having an external GPS antenna on the roof of an asset with constant sky exposure is no longer required. At any time, the apparatus makes the most current location available within a radius small enough to identify the location of the device. Even when the asset is inside a tunnel, a dense forest, a parking structure, or between high-rise buildings in an urban center, the location data can still be available and sufficiently accurate.

As a durable global asset-tracking device, the device is small in size for greater flexibility in installation and transportation. The device is adapted for possible installation on a variety of assets including containers, trailers, appliances, etc. It can be mounted on the top or on the side of the asset, or even under the bottom of a vehicle.

Second, the device does not require a constant power supply over an extensive period, as the design permits continuous functioning of the device during shipment of the asset where power recharging from an external source may not be available. If the device is mounted on a container, for example, it will be able to report its current location throughout the course of transportation on a train or in a ship. Thus, the device relies on its own power supply over extended periods without access to an external electrical source.

Third, sometimes the assets to be tracked are stacked on top of each other, making it impossible for a conventional tracking device to be exposed to GPS satellites. As a result, no valid position information can be obtained from the satellites of the GPS constellation. The preferred device takes advantage of the well-developed GPS system and obtains accurate location information whenever the GPS signals are available. Direct exposure to GPS satellites at all times, however, is not required. The device obtains position information from GPS satellites whenever valid GPS signals are available, and provides its own location tracking capability at the time when GPS are not accessible.

Fourth, the position accuracy of the device must be always within a reasonable range in order to make the tracking system useful. At any moment, if there is a need to pinpoint the location of the device, the position accuracy of the system will be within a 20-meter radius from the exact location. This is useful for numerous possible applications of which some are listed below. To offer the capability of durable, global asset tracking, the device has the following characteristics that, together, differentiate it from existing asset-tracking devices.

Small in size to be portable and easily installable
Long duration without the need of a constant, external power supply
Location accuracy always within a short range for position identification
Direct exposure to GPS satellites is not always required The Overall System A preferred embodiment of the device, or system, 10 comprises five inter-related modules that work together to provide the intended functionality: a location module 12, a communication module 14, a power module 16, an antenna module 18, and a processor module 20. The components and data processing of each module are described below.

FIG. 1 illustrates the framework of system 10. System 10 comprises five inter-related operational modules of which each has a specially designed integrated circuit board handling different functions of system 10. The location module 12 identifies the best available position information and stores the information in its storage component available for retrieval at any time. The current position information is passed to the processor module 20 for interaction with other modules. Communication module 14 detects the most cost-effective, available communication mode and passes such information to processing module 20. At any moment, the communication mode is stored in processor module 20 and communication is established. Power module 16 manages the system's power use and recharging. The current state of the power use is stored in processor module 20. Whenever system 10 is not moving, power module 16 shuts down system 10 and keeps only the necessary sensors up for instruction. Power module 16 also manages the recharging mechanism whenever necessary. Antenna module 18 connects the antennas 22, 24, 26 and 28 of a GPS receiver, local RF, cellular networks, and satellites receiver, respectively, with processor module 20 as described in greater detail in FIG. 9. Processor module 20 controls the storage and flow of data throughout system 10. The current parameters are kept and intelligent decisions are made within the processor module 20. The processor module 20 also provides instructions to all other modules 12, 14,16 and 18 to perform according to the status of system 10.

A. Location Module

Figure 2:
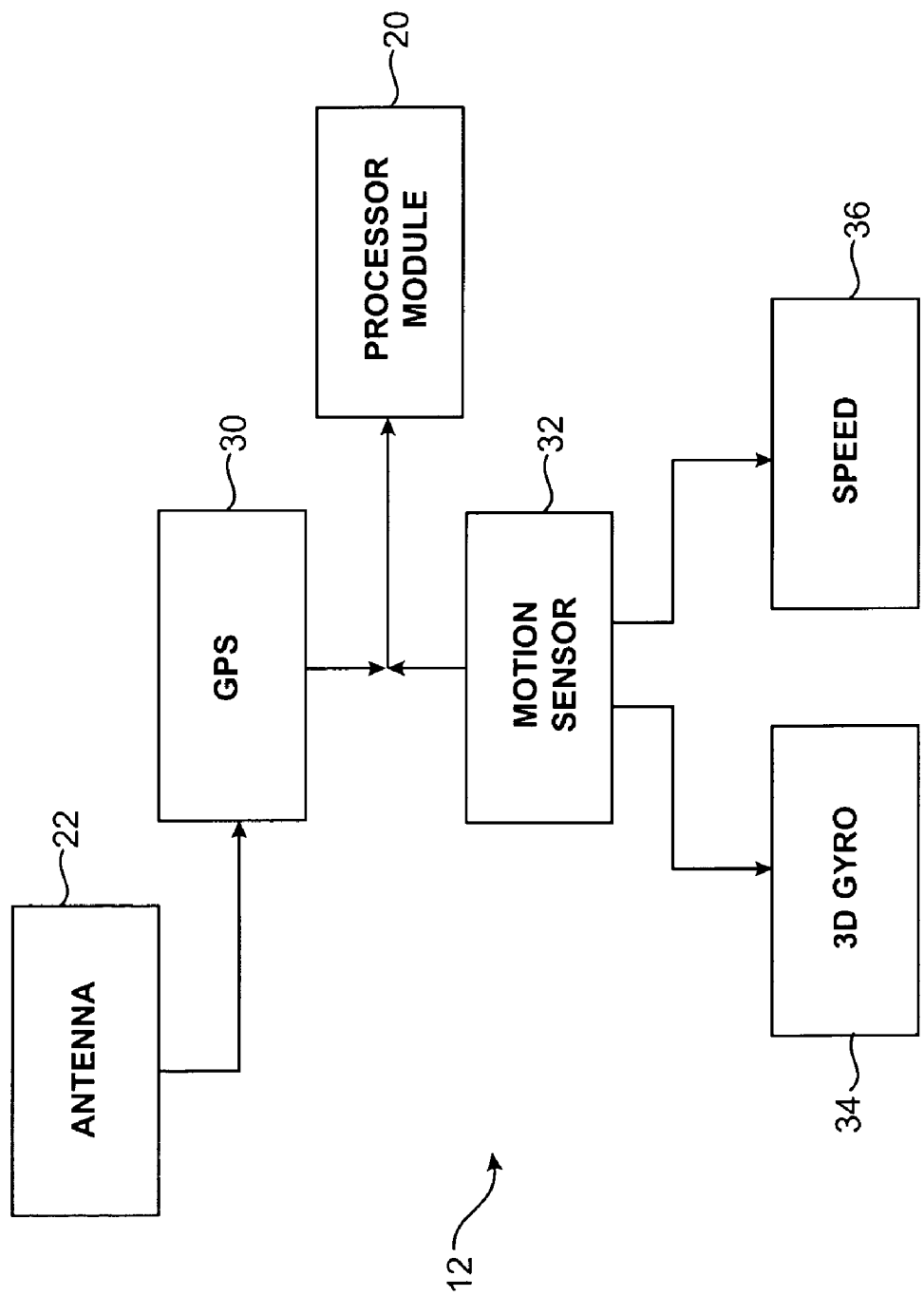
FIG. 2 is a simplified block diagram of the location module of FIG. 1.

In FIGS. 1 and 2, location module 12 comprises an embedded integrated circuit board including two components: a GPS engine board, or chipset, 30 capable of processing data received from the GPS antenna 22 of antenna module 18, and a dynamic motion sensor 32 comprising a three-dimensional gyro motion detector 34 and a speed computation processor 36. GPS engine board 30 is useful for both determining the initial location of system 10 and correcting location information during the movement of system 10, whenever valid GPS readings are available. Motion sensor 32 is used to dynamically adjust the location of system 10 based on the internal calculation of the direction and speed of any movement. The accurate location of system 10 is obtained by a combination of three internal processes in the location module, namely location initialization, motion detection, and GPS correction.

Figure 3:
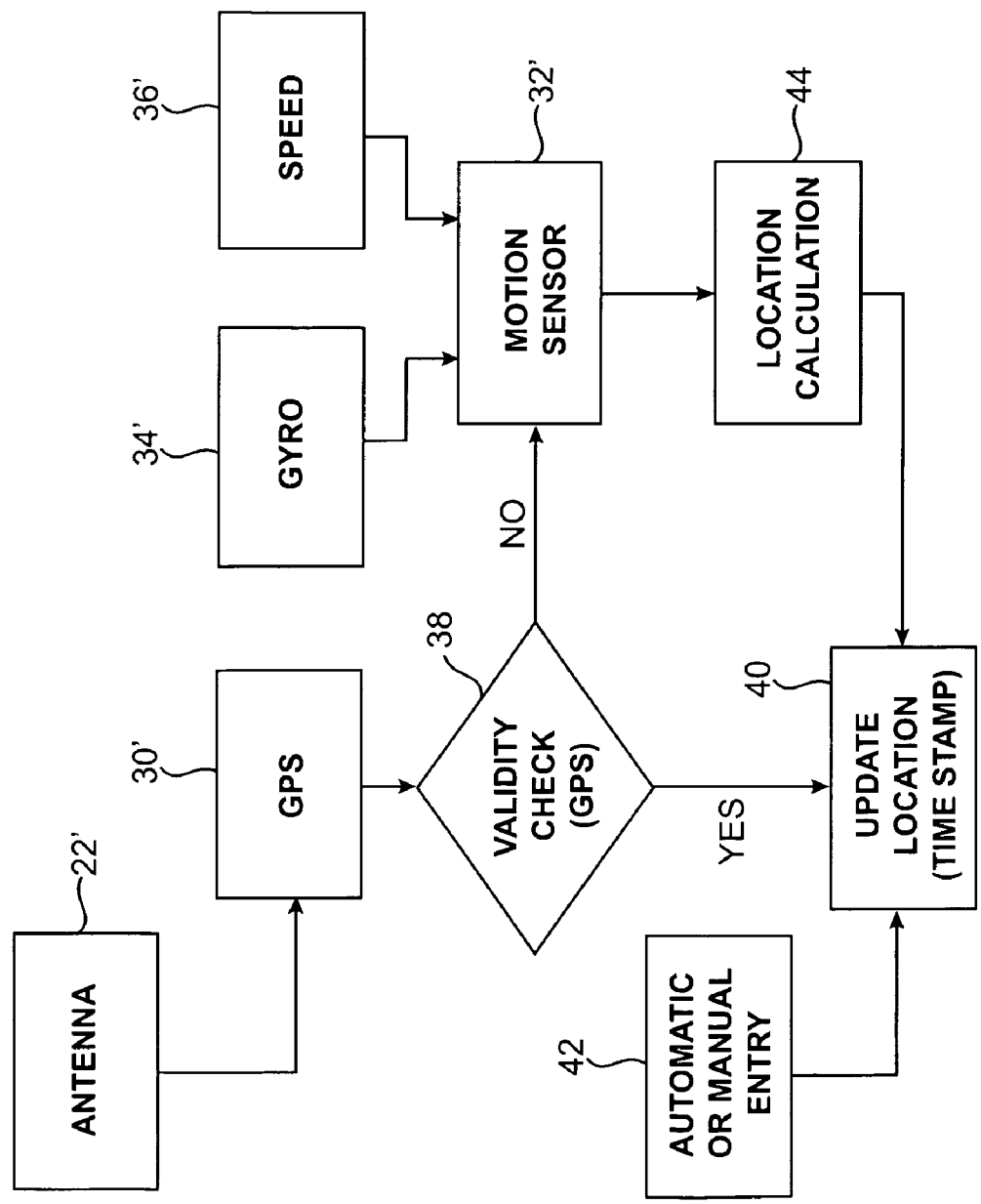
FIG. 3 is a simplified flow diagram illustrating the flow of data and control in the location module of FIG. 2.

GPS antenna 22 sends the most recent GPS signal to GPS chipset 30, which in turn passes the latest valid position reading to processor module 20. Motion sensor 32 is always active and is connected to gyro 34 and speed calculator 36. The received GPS reading is constantly checked for validity. Motion sensor 32 determines if system 10 needs to "wake up" or can remain in the sleep mode. Gyro 34 derives the motion of system 10 in three dimensions. Speed calculator 36 estimates the acceleration and deceleration at any given moment. The position information derived from gyro 34 and speed calculator 36 is processed internally for position calculation. The data flow in location module 12 is depicted in FIG. 3.

Location Initialization

Internally, the location of system 10 is expressed with the geographical coordinate system in conventional longitude and latitude readings. The initial location of system 10 is set when system 10 is ready to deploy, using either (1) a GPS data entry, (2) a location initialization input device, or (3) a manual position entry. Any one of the three processes is sufficient to initialize the location of system 10.

Consider first GPS entry. The initial location can be set with the built-in GPS engine board 30. One only needs to take system 10 outdoors for a few seconds, and system 10 will initialize its GPS position by itself. The GPS position is then stored in the memory. This method is most convenient as it only requires direct exposure to GPS satellites. This is diagrammatically illustrated in FIG. 3 where receipt of GPS data from the satellite location system is symbolically represented by step 22' and the data processed and its earth coordinates generated at step 30'. The validity of the GPS coordinates and data is checked in a conventional manner at step 38 to insure a valid reading and stored in memory at step 40.

Consider now the use of the location input routine. One can initialize the position using a simple data entry device, such as a personal computer, a laptop computer, a handheld computer, a personal data assistant (PDA), or any other device that can send a position signal through a serial port, infrared port, USB port, network connector, or any communication port to allow for automatic or manual entry of position information. This method is most useful when a large number of devices are to be initialized, such as at the manufacturers site. The longitude and latitude readings are known and stored in a simple utility program. As soon as system 10 is connected to the external data entry device (not shown) at step 42, the location is automatically stored in the memory and the initial position of system 10 is initialized.

In a similar manner, a third way of initializing the location is to enter the longitude and latitude of the current position manually at step 42 using any external device through a serial port, Infrared port, USB port, network connector, or any such device to allow for manual entry of the location. This mechanism ensures that system 10 can be used after being dormant for a long period of time and the current location can be re-initialized whenever necessary.

Once initialized, the location information is kept in processor module 20. The initial location will be changed along with the movement of system 10. As soon as system 10 is moved, the current location reading becomes different from the initial location.

Motion Detection

In FIG. 2, the location module 12 is installed with a motion detector 32 including a three dimensional gyro, or direction detector, 34 and a speed detector 36. As shown in FIG. 3 at step 34' the three dimensional gyro 34 calculates the motion of system 10 in three dimensions, typically expressed as x, y, and z, where x represents longitude reading, y represents latitude reading, and z represents altitude reading. The three dimensional gyro 34 is composed of three independent sensors each of which calculates the change in velocity, acceleration or deceleration along an assigned axis. Speed detector 36 calculates at step 36' the movement of system 10 along the three dimensions and converts such motion into a new position of system 10. The initial location of system 10 is altered according to the motion of system 10. The calculation is made inside system 10 at step 32' and no GPS reading is required for such calculation. Motion detection is automatically activated whenever system 10 is moving while there is no valid GPS reading as determined at step 38.

GPS antenna 22 always passes the GPS signals to the GPS chipset 30. Each GPS signal is evaluated for validity at step 38. If the latest GPS reading is valid, both the updated current position and the time stamp when the signal is received are passed to processor module 20 at step 40 for storage and real-time retrieval. If the latest GPS is not valid, a position calculation based on the motion sensor is activated at step 32'. On the right-hand side of FIG. 3, motion sensor 32 determines at step 32' if system 10 is moving. If system 10 is not moving, no position calculation is needed and the current position is maintained. If system 10 is moving, gyro 34 and speed calculator 36 pass their latest quantities to the motion sensor 32 for position calculation at step 44. The calculated result is used to update the current position of system 10 at step 40.

GPS Correction

Using a motion detector to dynamically adjust location information is subject to errors at different steps of the computation. In general, the errors are small and random for each computation. Thus, over a long period of time, the individual errors may balance out among themselves or the cumulative error may accumulate over time. In any case, it is always helpful to correct the location reading whenever a GPS reading becomes available. When system 10 is inside a building, tunnel, parking structure, or a narrow valley, for example, a valid GPS may not be available. In this case, the current position of system 10 is adjusted though the motion detector. Whenever a valid GPS reading becomes available, the current location is automatically corrected at step 44.

GPS correction may take place even when system 10 is not directly exposed to GPS satellites. When GPS antenna 22 is in the direct line of sight of GPS satellites, the signals are most reliable and accurate. An additional mechanism is automatically activated when no direct GPS readings are available. The indirect GPS reading may be obtained from either reflected or re-radiated satellite signals. Although the reflected or re-radiated GPS signals do not provide the same level of positional accuracy as direct line readings, they nonetheless provide enough accuracy within a 20-meter range. In the future, a major public structure may be installed with a GPS receiver that re-radiates GPS signals to the neighborhood. System 10 will then be able to detect such re-radiated GPS signals and correct the position automatically.

Another way of correcting GPS position is through an RF connection wherever localized position information is broadcast from a station. Different modes of position information can be transmitted for short-range communication applications. As an example, designated short-range wireless communication frequencies called Bluetooth may be used for broadcasting localized position information. Another possible implementation in the future is the use of RF among public agencies to continuously broadcast position information to any mobile receivers capable of interpreting the code. When either a Bluetooth-based network or a local RF network is implemented for position information, and the designated frequency and interpretation code are made available to the public, system 10 will be able to correct its GPS position accordingly. Since the accuracy of such local position information is not as accurate as GPS, GPS data will always override any position calculation based on reflected GPS, re-radiated GPS, or localized position information through Bluetooth or other localized RF systems.

B. Communication Module

Communication module 14 is designed to manage communication continuously and uninterruptedly between system 10 and a known central facility at a remote site, and to ensure that the current location of system 10 is always available at the central facility. Given that no existing terrestrial communication network provides global coverage, module 14 must be built on a scalable, multi-platform architecture to ensure uninterrupted global communication.

Figure 4:
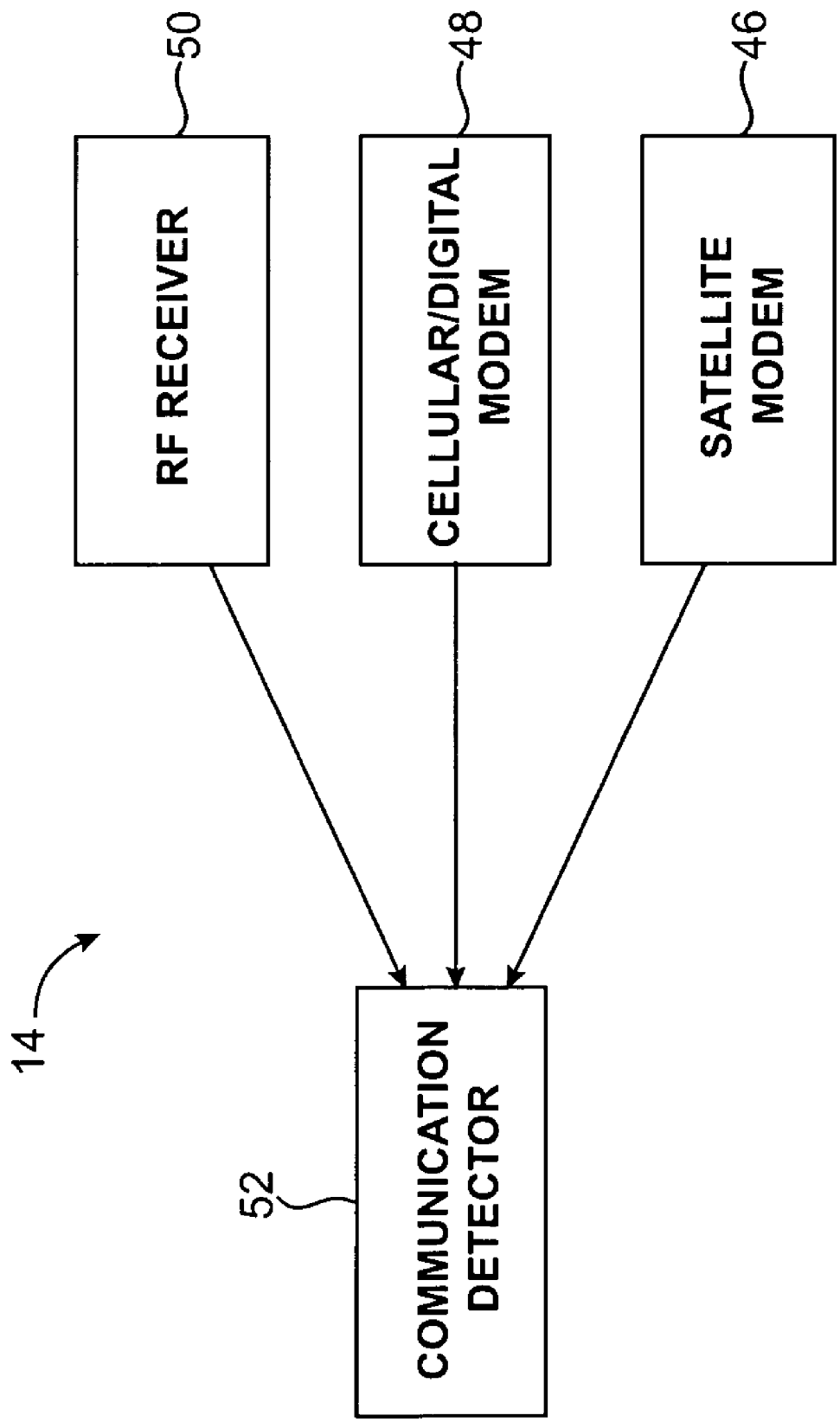
FIG. 4 is a simplified block diagram of the communication module of FIG. 1.

Communication module 14 comprises three components as shown diagrammatically in FIG. 4, including a scalable receiver 50 for communications through radio frequency signals (RF), a multi-band radio modem 48 for common cellular communications or wireless digital communications, and a dedicated modem 46 for satellite communications. The operation of receiver 50 and modems 48 and 46 are coordinated and controlled through communication detector 52, which may comprise a printed circuit board designed to compare incoming signals from each communication network with their corresponding protocols. Communication module 14 has a subprogram that evaluates the validity of each communication system and determines the most cost-effective mode available, and automatically switches the communication to that mode.

Communication module 14 detects the availability of a wireless communication mode and establishes the connection whenever needed by means of communication detector

52. It always checks the availability of any local RF as this is the least expensive mode. If a local RF connection cannot be made, it opens the digital cellular channels and detects from the list of priority any existing channel for communications.

Figure 5:
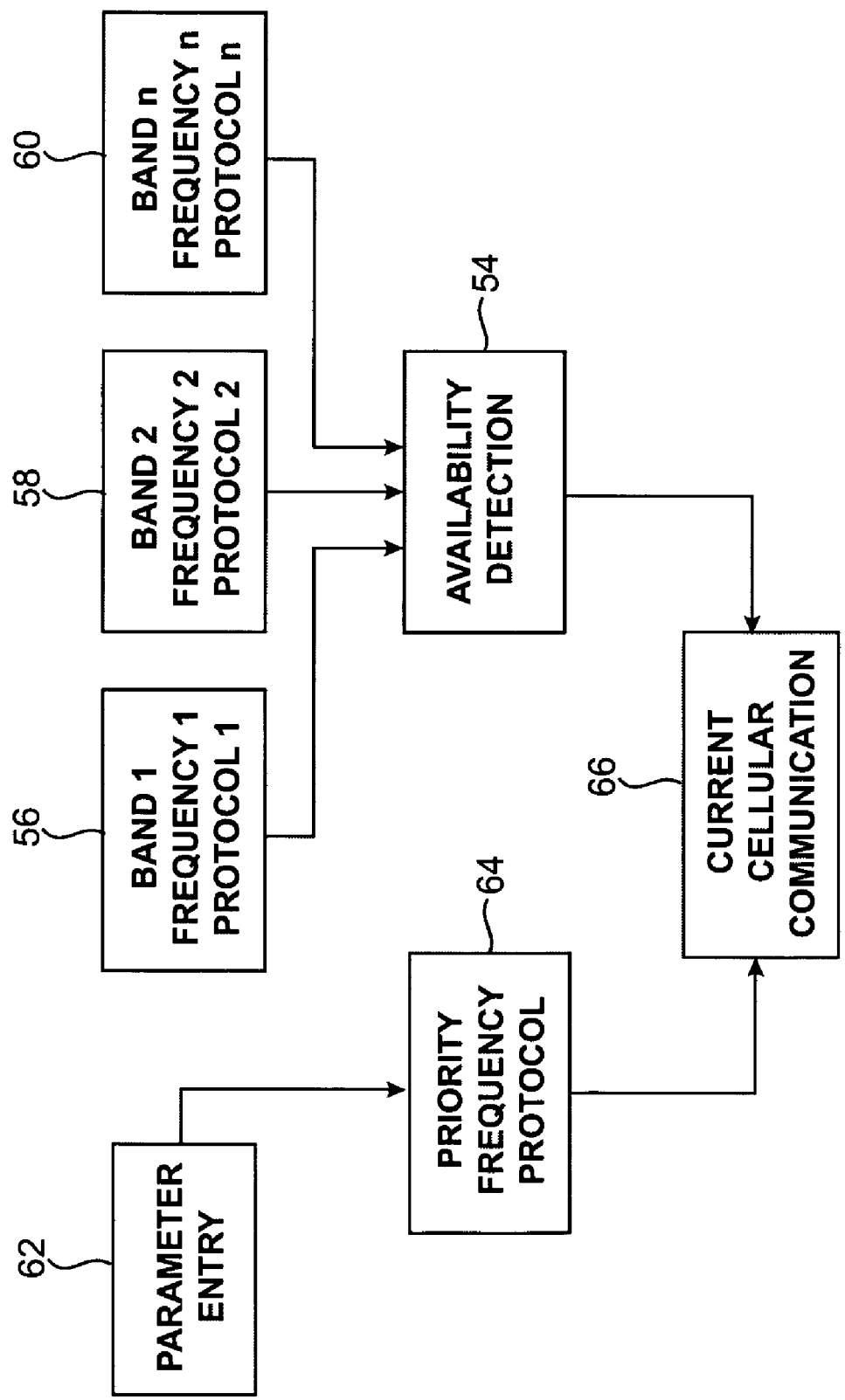
FIG. 5 is a diagram of a multiband cellular communication system.

The processing taking place in communication module 14 is to establish a multiband, digital cellular connection as depicted in FIG. 5. If none of the registered digital cellular networks are available, the satellite communication is established at step 54 only when needed. Communication module 14 is capable of establishing the wireless communication through a plurality of commercial or public digital cellular networks, symbolically depicted as occurring in steps 56, 58 and 60. Since different networks vary in both frequency ranges and protocols, each network has to be registered so that its code can be correctly interpreted. The frequency range and protocol of each available network must be entered into a system registry in system 10 and a priority level is assigned. The assignment of priority levels at step 62 is based on several factors: coverage, signal strength and reliability, and cost. The multiple bands are evaluated at step 54 whenever system 10 requests a cellular connection. The frequency range is adjusted to receive signals within the network under evaluation. From the network of highest priority down as determined at step 64, when a network is received with sufficiently strong signals, the connection is established at step 66 and the appropriate protocol is deployed for the communication.

Local RF Communication

If an asset is to be transported within a predefined geographical area and a local RF communication network is available within the area, such as tracking police cars within a jurisdiction or tracking heavy equipment for a major construction project, communication through the local RF network might be most effective and least expensive. Most public safety agencies operate their own dispatch systems and have fulltime dedicated channels for communications. Such communications usually offer a better coverage even within structures. System 10 will allow the user to take advantage of the available RF communications for the most cost-effective tracking. Due to the fact that local RF networks vary in frequency, system 10 will use a scalable RF modem so that the communication can be adjusted whenever necessary. This mode, if available, will preferably be the first choice of communication for system 10. The localized RF network is activated only when system 10 is to be tracked within a specific jurisdiction. For instance, police vehicles within a county can be tracked using the county's existing RF if so desired.

The RF capability serves another important function in receiving GPS location through a transporter, instead of directly from the GPS satellites. This is possible when system 10 is attached to a container on a ship, stored inside a warehouse, or in any other enclosed structure where directly receiving GPS signals is not possible. If the ship, the warehouse, or the enclosed structure has an external GPS receiver and the receiver broadcasts the GPS location through an RF channel, the position information is received and the current location us updated accordingly. This introduces an additional mechanism to ensure the accuracy of location information.

For vehicle tracking, the same idea applies in the situation where the vehicle is already installed with a GPS antenna mounted on the exterior. System 10 can detect the GPS signals transmitted through a short-range local area network component and receive the position information directly. In this case, system 10 can be a portable device by itself or attached to any device such as a PDA or a mobile data computer.

Figure 6:
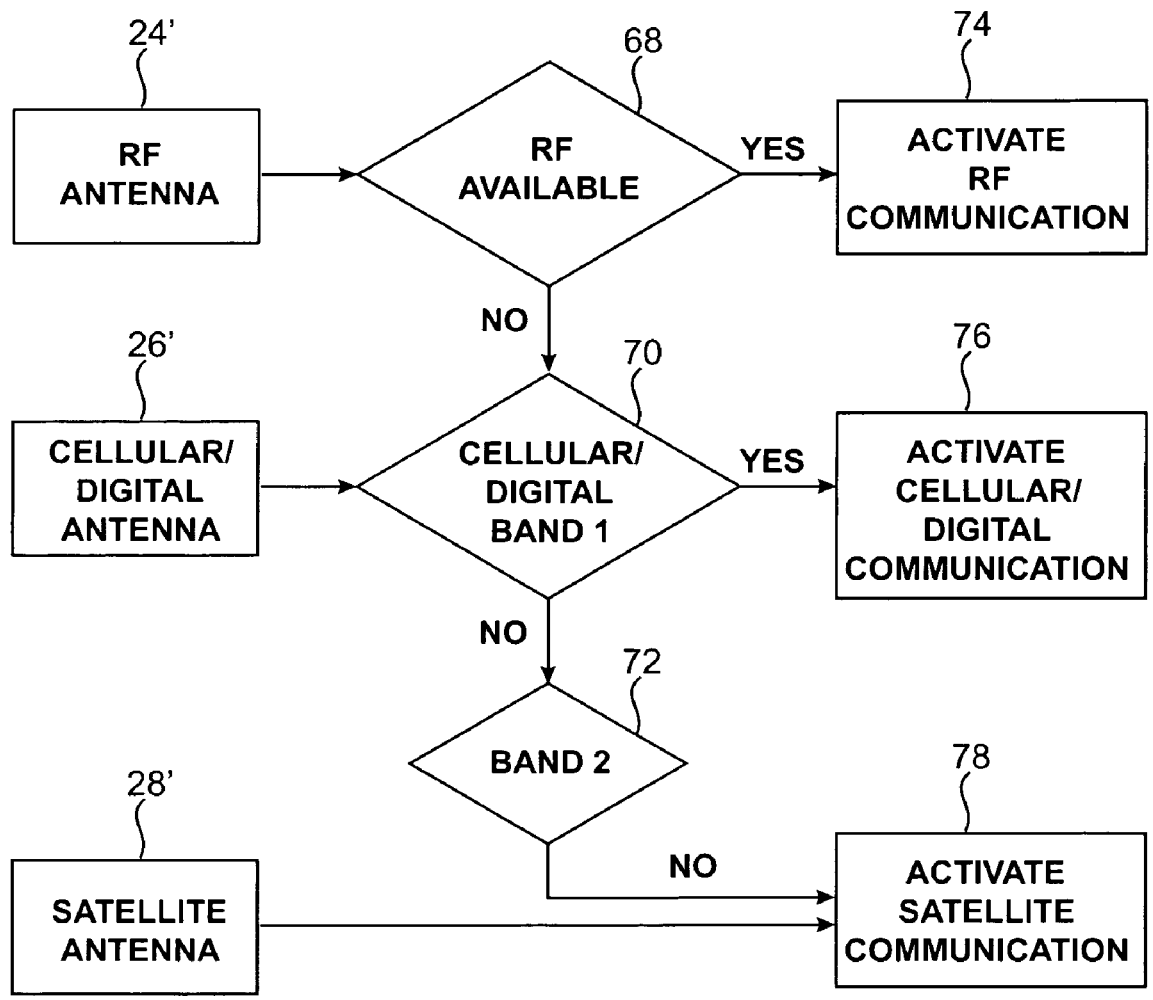
FIG. 6 is a simplified flow diagram illustrating the flow of data and control in the communication module of FIG. 4.

In FIG. 6, communication module 14 preferably processes data in the following manner. If a local RF network is received and connected at step 24', the communication is set at this mode and no other communication is needed as determined at step 68. RF communication is activated at step 74. If no local RF network can be connected, the multi-band cellular connection at step 26' is attempted. According to the priority level, each registered network is tested and the one with highest priority and availability is connected at step 70. The cellular/digital communication is then activated at step 76. If after all the registered cellular networks have been exhausted and no connection is made as determined at step 72, the satellite connection is established at step 28'. Satellite communication is activated at step 78.

Whenever the communication is on satellite, the communication module will continue to search for RF and cellular connection. As soon as either a local RF network is found, or a cellular network can be connected, the satellite connection is dropped and the communication re-established.

Multi-Band Cellular Communication

If a local RF network is not available for the tracking system, or the asset tends to be transported over a wide geographical area, a second communication mode can be made through a commercial cellular network, or wireless digital network, such as CDPD, CDMA, AMPS, GSM, Mobitex, etc. These networks tend to offer extensive coverage, although in most cases no single network offers complete worldwide coverage.

Communication module 14 utilizes an adjustable multi-band radio modem 48 so that it does not rely on any one single network to provide communication capability. A built-in sensor will detect the availability of each network and establish communication with the available network.

Communication module 14 requires a specifically designed integrated circuit board with the following processing capabilities. First, a system-setup mechanism allows the user to input as parameters (1) the frequency range, (2) the protocol, and (3) the priority level for each cellular network to be incorporated at steps 62, 64 as shown in FIG. 5. Such parameters can be transmitted wirelessly through any existing communication channel. If a new protocol is to be added to the existing list of registered networks, the user can either manually enter the parameters through a serial connection or send the parameters to system 10 remotely using any existing channel. Second, when communication module 14 is activated, it always scans from the channel of highest priority level down through the list. Third, when a channel on the priority list is scanned, the frequency is adjusted to the specific range and the protocol is interpreted accordingly. Fourth, at any point, if a channel being scanned is detected and found to be valid, the communication is set at the channel and the scanning mechanism is terminated until the channel becomes invalid at a later time.

Satellite Communication

Commercial cellular communication networks and wireless data networks suffer from their inability to provide complete global coverage. Over vast areas of deserts, forests, and oceans, one can utilize any one of the available long-range radio communication technologies. Among the available long-range radio communication technologies, satellite communications are most reliable and efficient. Communication module 14 is equipped with a satellite communication modem 46 to transmit and receive signals through communication satellites.

The use of satellite communication is required only when no other means is available. When detector 52 cannot establish communication through local RF radio networks, cellular networks, or wireless data networks, it activates satellite modem 46 to ensure non-interrupted communication with the central facility. The satellite communication is automatically terminated if another mode of wireless communications is established.

C. Power Module

Due to the durability requirements of tracking assets, system 10 is able to function continuously for an extensive period of time. In a preferred embodiment, system 10 is able to operate for a minimum of one year without external recharging. Requirements for duration longer than one year can be achieved by enhancing power module 16. To achieve the objective of long durability, power module 16 utilizes an innovative power management mechanism to minimize the use of power while recharging the battery whenever possible. In particular, power module 16 is configured to switch between a sleep mode when the system 10 is stationary and a wakeup mode when the system 10 is moving.

Figure 7:
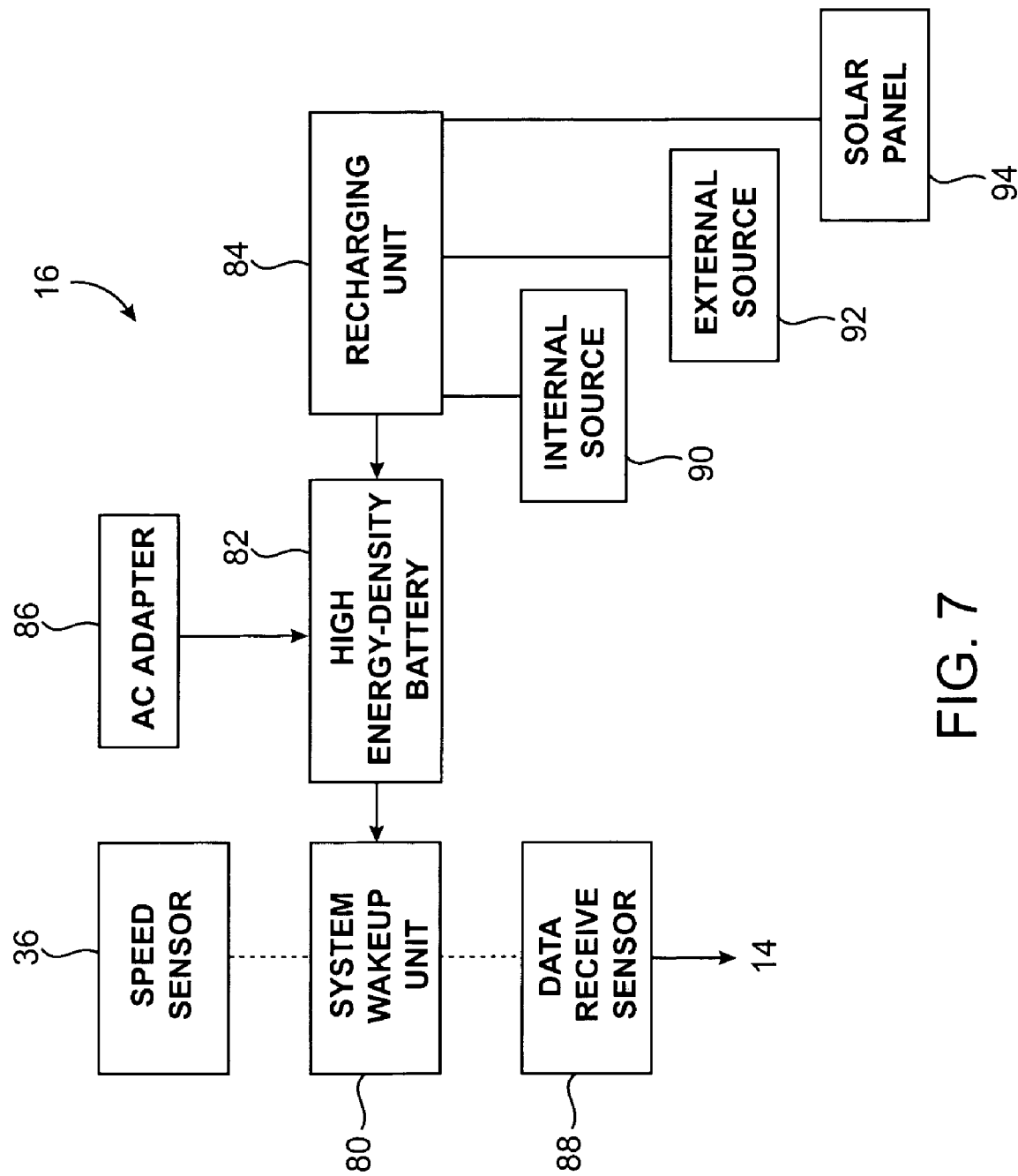
FIG. 7 is a simplified block diagram of the power module of FIG. 1.

Power module 16 comprises four components as diagrammatically depicted in FIG. 7, including: (1) an external system wakeup unit 80, (2) a high energy-density battery 82, (3) a self-recharging mechanism 84 using either a mechanical recharging device, a solar panel, or any device that can generate power within system 10, and (4) an external AC adapter 86 which can be used to recharge system 10 whenever any AC power source becomes available

System Wakeup Unit

The system wakeup unit 80 plays an important role in energy conservation. Unit 80 is adapted to maximize the duration of system 10 by minimizing the use of battery power. Unit 80 controls system 10 in such a way that whenever system 10 does not need to stay live, it will shut down all the components of system 10 that need not function and keep system 10 in a sleep mode. When system 10 is in the sleep mode, only key sensors that consume the minimum amount of energy will be kept active.

System wakeup sensor 80 is connected to the speed sensor 36 in the location module 12. When system 10 is not moving, speed sensor 36 remains active. When system 10 starts to move again, speed sensor 36 will issue a signal to trigger system wakeup unit 80 to start functioning.

In addition to speed sensor 36, system wakeup unit 80 is also equipped with an optional data receive sensor 88 connecting to communication module 14. Data receive sensor 88 is identical to that installed in commercial pagers and it consumes minimum energy when no communication is taking place. Data receive sensor 88 makes it possible for the central facility to activate system 10 remotely for any reason. In principle, system 10 stays dormant if it is not moving, and during the period when system 10 remains dormant, the central facility already has the current location through the last transmission, no matter how long ago it was recorded. Data receive sensor 88 allows the central facility to issue a system wakeup command and receive a current report of the location, just to make sure system 10 remains functional. In most cases, the optional data receive sensor 88 is used for system testing.

High Energy-Density Battery

A nonleaking, high energy-density battery 82, such as a specially designed lithium polymer battery or a more commonly used lithium ion battery, or any other battery that will enhance the energy efficiency, is included in system 10. Given the current battery technology and the system's effective mechanism for minimization of energy use through the control in power module 16, a power unit 82 of compact size can sustain system 10 over an entire year without the need for recharging, if system 10 stays dormant or if the communication between system 10 and the central facility is maintained at a relatively low level. Battery 82 is recharged automatically through an external AC 86 and the built-in recharging unit 84.

Recharging Unit

Recharging unit 84 is implemented with any single or multiple recharging source available, depending on the use of system 10, including an external recharging source 92, an optional internal recharging source 90, and a solar power source 94. With any one or more of the recharging components are implemented, battery 82 is recharged whenever any of such components works.

The external mechanical recharging source 92 allows system 10 to be attached to any external mechanical power source, such as on a windmill or a device to generate power by wind. For the wind-powered recharging unit 84, the system 10 has four openings on the corners to allow for air to flow through. In each opening, a wind-driven propeller (not shown) rotates whenever air flows through. As the system 10 is attached to the surface of a container, for instance, and as the container moves during shipping, the four propellers automatically recharge power unit 16. The internal mechanical recharging source 90 uses any equipment that generates electricity whenever system 10 moves. For instance, a pendulum pulling a thin-wire spring in the internal recharging source 90 when system 10 moves may recharge battery 82 accordingly with a trickle charge. The solar recharging source connects a charging mechanism to the solar panel 94 on the surface of system 10. If system 10 is installed on the surface and receives sunshine, it automatically generates energy and passes the energy to recharging unit 84.

Recharging unit 84 is designed to prolong the duration of system 10 over an extensive period of time. As long as recharging unit 84 remains functional, the system 10 will continue to operate without limitation.

AC Adaptor

The AC adaptor 86 is installed for recharging battery 82 whenever an AC power source becomes available. Even though system 10 may be running on battery 82 for an extensive period, any time the chance arises, recharging from the external power source will ensure the maximum recharging of battery 82.

Thus, it can be appreciated that as shown in FIG. 7 power module 16 is built on a high energy-density battery 82 to supply the needed power for processing and transmission of data. Battery 82 is connected to a system wake-up unit 80, an AC adapter 86, and a recharging unit 84. System wake-up unit 80 plays an important role in controlling the use of power and it shuts down the system whenever there is no motion of system 10 over a threshold time period. When system 10 is shut down, only needed sensors are kept active to minimize energy consumption. AC adapter 86 allows battery 82 to be recharged from an AC source whenever possible. Recharging unit 84 contains at least an external recharging source 92 and an internal recharging source 90, and also connects to a solar panel 94 attached to the surface of system 10. The management of power use is depicted in FIG. 8.

Figure 8:
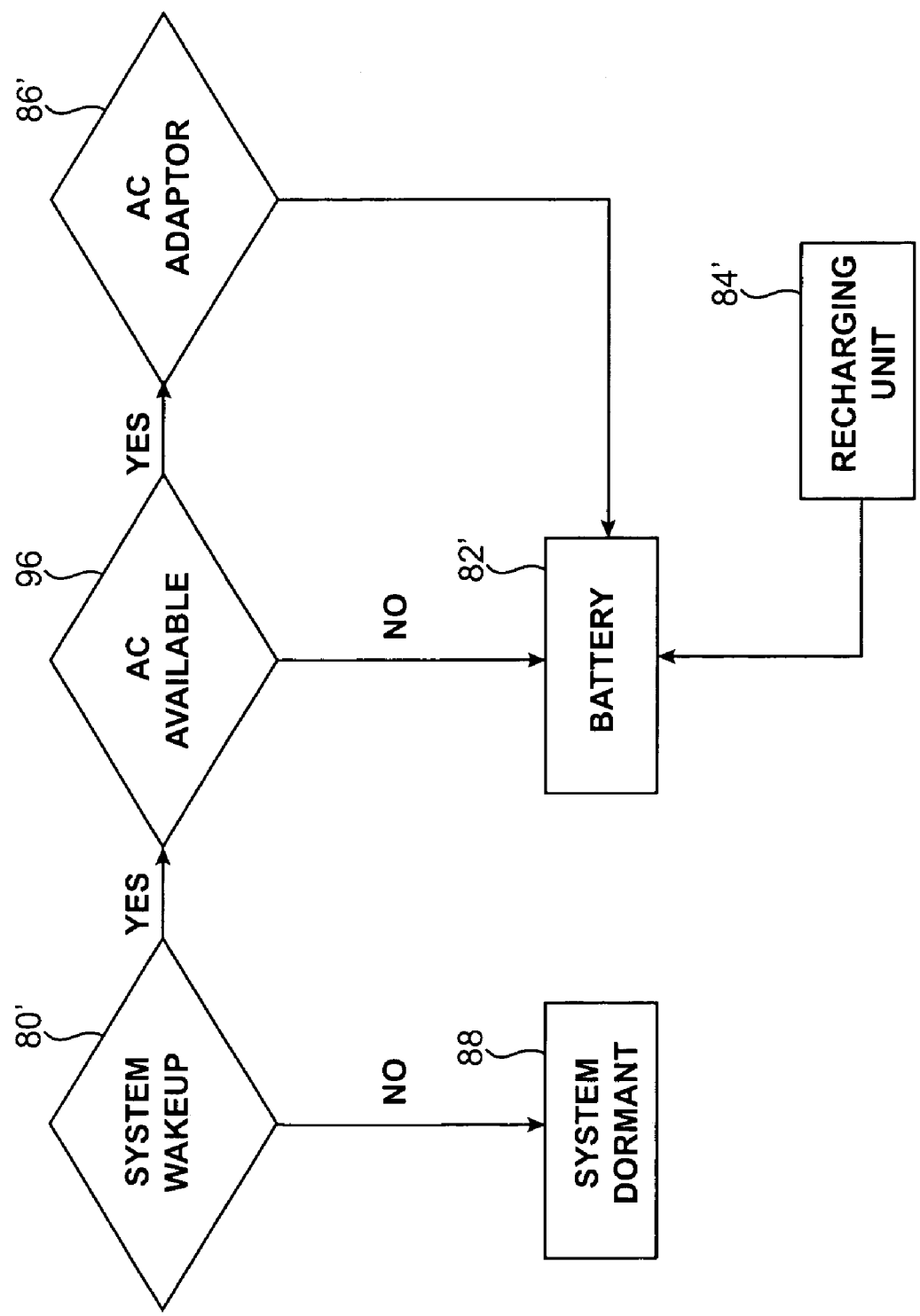
FIG. 8 is a simplified flow diagram illustrating the flow of data and control in the power module of FIG. 7.

As diagrammatically depicted in FIG. 8 at step 84', recharging unit 84 in power module 16 constantly recharges battery 82 at all times if the source is available. When system 10 is stationary, neither internal recharging 90 unit nor the external recharging unit 92 will be active. If the surface of system 10 is not exposed to the sun, the solar-power recharging unit 94 will not work either. Since system 10 is not moving, minimal power will be consumed and battery 82 can last for an extended long period by lying in a dormant state at step 98. System wake-up unit 80 determines at step 80' if system 10 needs to be kept in the sleep mode. If system 10 is not moving, system wake-up unit 80 shuts down system 10 to conserve energy. If system 10 is up, wake-up unit 80 will detect if an AC source is determined to be available at step 96 to recharge system 10. If no AC source is determined to be available at step 96, then system 10 continues to operate under battery power only. If an AC source is available, AC adapter 86 is connected to battery 82 at step 86' and battery 82 is charged at step 82'.

D. Antenna Module

Figure 9:
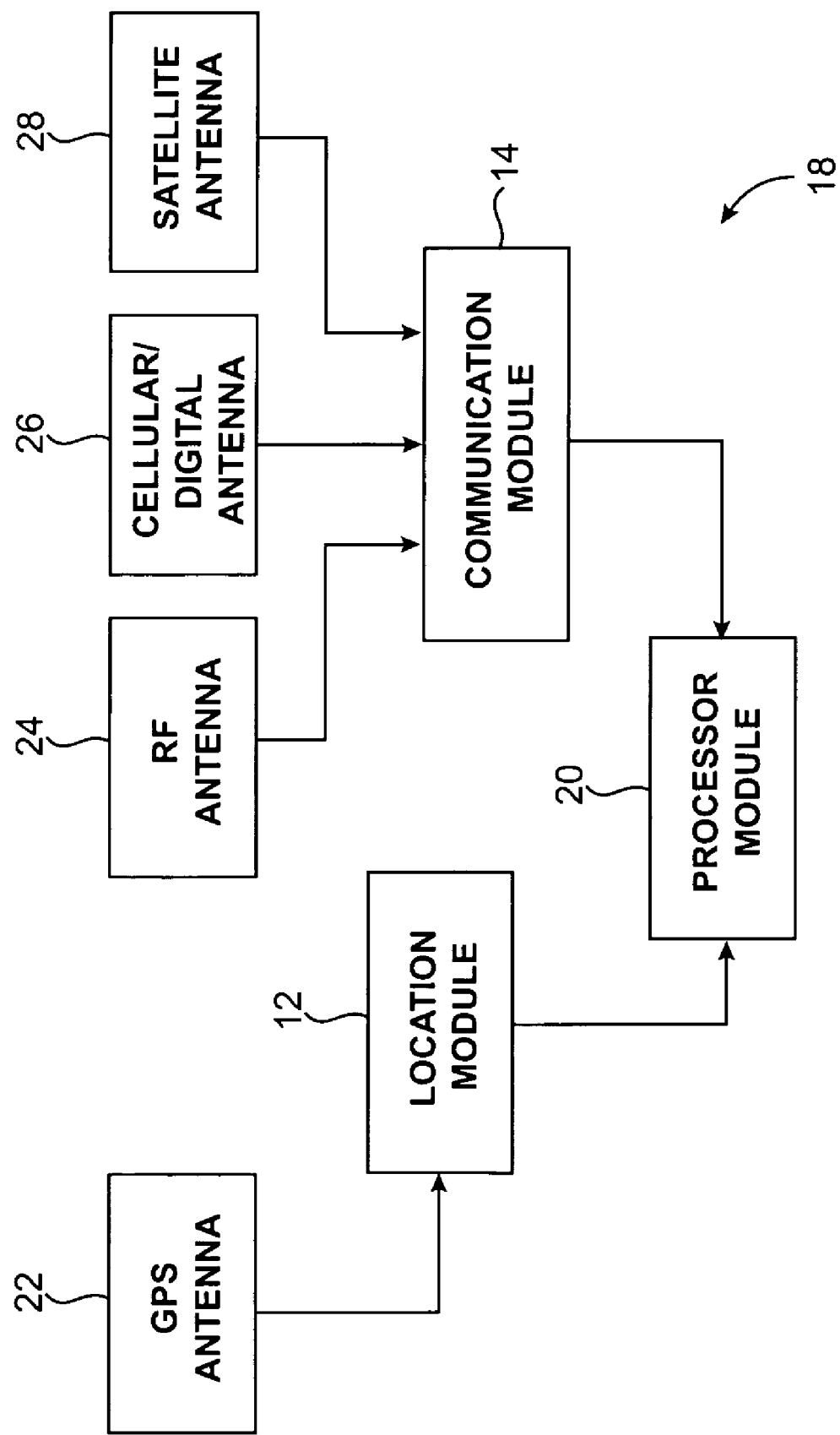
FIG. 9 is a simplified block diagram of the antenna module of FIG. 1.

Antenna module 18 as shown in FIG. 9 contains a set of antennas, including the GPS antenna 22, antenna 24 for low frequency RF, antenna(s) 26 for the multi-band terrestrial wireless communication networks, and antenna 28 for satellite communications. Antenna module 18 is equipped with an antenna controller (not shown) that constantly checks the validity of signals from any of the antennas to determine the availability of communications. All the antennas are mounted on the surface of system 10 to maximize effectiveness of reception and transmission.

GPS Antenna

GPS antenna 22 receives satellite signals from the GPS constellation. If GPS signals are strong enough to get the position, the data will be used to update the location of system 10. GPS antenna 22 is usually mounted on the top cover of the shipping container or tracked object to maximize its exposure to GPS satellites. If system 10 is to be mounted on the side, then antenna 22 can be moved to the side of the shipping container or tracked object wherever most appropriate.

System 10 may be attached to a container on a ship, inside a warehouse, or in any enclosed structure where GPS signals cannot be received directly. In such cases, if the ship, the warehouse, or the structure has installed an external GPS and reradiate the GPS signals to any GPS receivers within the structure, the GPS antenna can continue to receive the accurate position and update the location of system 10. This will ensure that even when system 10 is not moving by itself, it still can update its location.

RF Antenna

RF antenna 24 can be mounted on the side of system 10 of the shipping container or tracked object. Antenna 24 is to be used for communications with the available RF channel. Antenna 24 is adjustable for different frequencies of communication. For instance, when the system is installed in one of the vehicles of a police department, RF antenna 24 must be adjusted to maximize the communication through the specific channel.

Cellular Antennas

Antennas 26 for the multi-band terrestrial communications through either the commercial cellular networks, or wireless digital networks, can be mounted on the top or any side of system 10 of the shipping container or tracked object, depending on how system 10 is to be attached to the asset.

Satellite Antenna

Antenna 28 for satellite communication is also mounted on the top of system 10, depending on how system 10 is to be attached to the asset.

Thus in summary, it can be appreciated that the surface of the system is covered with four sets of antennas controlled by an integrated circuit board, GPS antenna 22, antenna 24 for local RF, antenna(s) 26 for cellular networks, and antenna 28 for satellite communications. GPS antenna 22 constantly detects and receives GPS signals, both directly from the GPS satellites if the surface is exposed to the sky, and indirectly from reflected signals and re-radiated signals. The received GPS signals are evaluated for validity in the location module 12. Local RF, cellular networks, and satellite antenna are all connected to the communication module 14. The exchange of location information received from GPS antenna 22 and the wireless communications through any of the existing mode takes place in the processor module 20.

E. Processor Module

Figure 10:
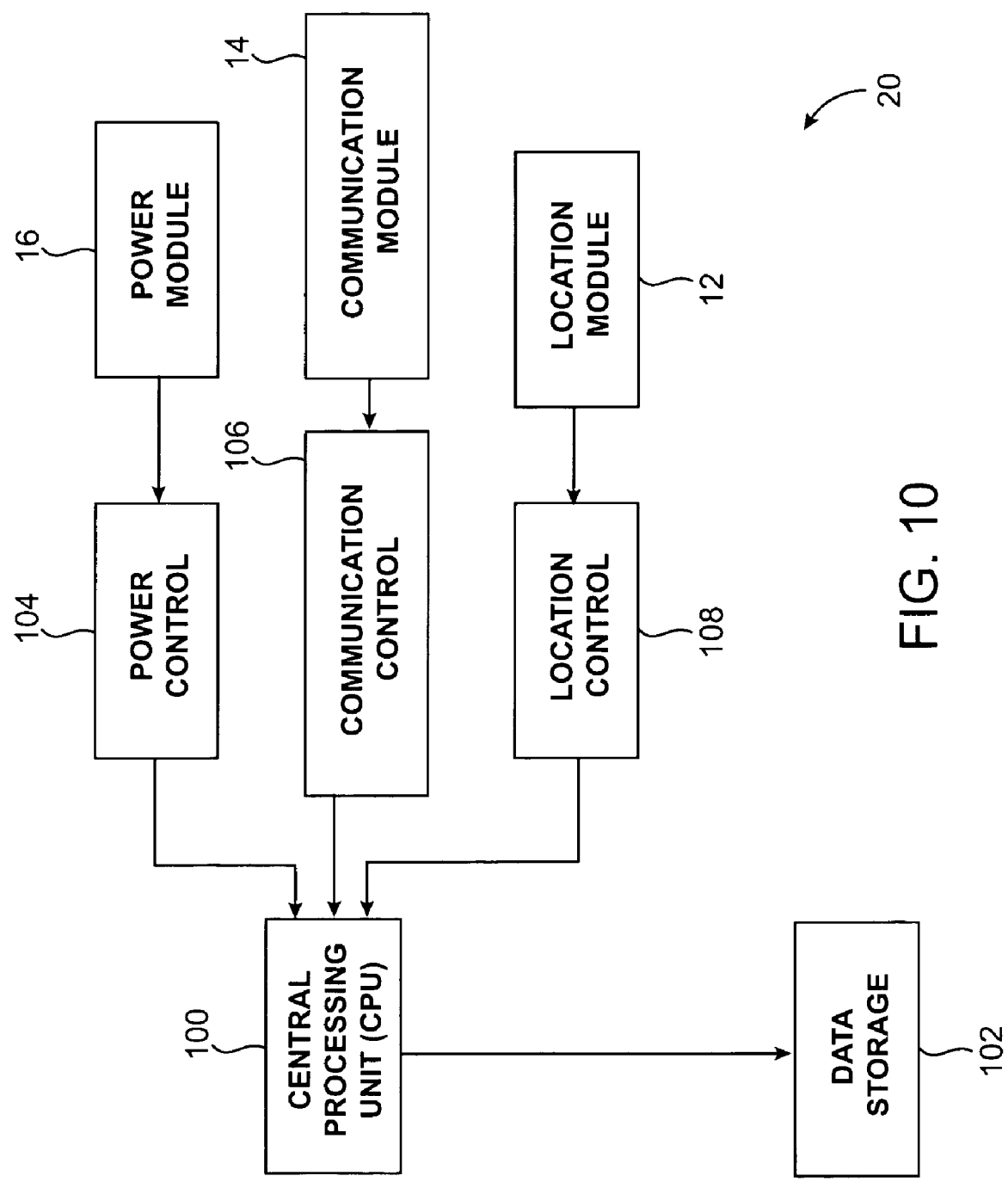
FIG. 10 is a simplified block diagram of the processor module of FIG. 1.

Processor module 20 as shown in FIG. 10 is the core of system 10 that controls data input/output, storage, manipulation, and the flow of data between different modules. Processor module 20 comprises a high-grade central processing unit 100 (CPU), such as Intel's Pentium IV chip, with a flash ROM, and a removable memory card, minimum capacity of 64 MB as storage 102, that can be used to store location information over an extensive period.

Power Control

A power control interface 104 couples CPU 100 with power module 16. When speed sensor 36 indicates no movement of system 10, all the components in system 10 are shut down except for two sensors, speed sensor 36 and system wakeup sensor 80. If speed sensor 36 detects motion of system 10, location module 12 is activated to update the position using either the GPS reading, if GPS is valid, or to receive the current location information that is broadcast through the RF, if such system is available. Otherwise, motion sensor 32 is used to calculate the current location from the three dimensional gyro 34 and speed sensor 36. Whenever the speed drops to zero, the system 10 returns to the dormant stage at step 98, shown in FIG. 8, and leaves speed sensor 36 and system wakeup sensor 80 on.

Battery recharging is activated automatically. If the external AC power source is connected, then the battery is recharged automatically. If any other recharging mechanism becomes available, the battery is automatically recharged until either the AC power source is connected or the battery is fully charged.

An option function can be included to issue a warning message to the central facility when the power drops below a pre-determined threshold. In this case, if the recharging sources successfully recharge battery 82 back to an acceptable level, another message will be issued to notify the central facility to erase the low power alert.

Communication Control

A communication control interface 106 couples CPU 100 with communication module 14. When the system 10 is in the dormant mode, no communication is needed. As soon as system 10 is activated by wakeup sensor 80, system 10 starts to establish communication. The function of communication control interface 106 determines the most cost-effective, available mode of communication. If local RF is available, the communication between system 10 and the central facility will always use the RF pursuant to processor's 100 control. Otherwise, system 10 will try to establish communication through any of the multi-band cellular networks or wireless data networks. Only if none of the above communication modes can be successfully made, will system 10 activate the satellite communication channel. While the communication is established at any level, system 10 will continue to detect the communication at a lower level, and switch to a lower level if it becomes available pursuant to processor's 20 control.

Location Control

A location control interface 108 couples CPU 100 with location module 12. The current location of system 10 is always registered in processor module 20. When system 10 was initialized, the initial location is registered immediately. Whenever a valid location update is received, either from GPS, from RF, or calculated by the built-in motion detector 32, the current location is updated and saved in memory 102. Whenever the system detects a valid GPS signal, the current location is also updated. At any moment, location control keeps the current location to be sent to the central facility upon request.

Thus, it can now be summarized that processor module 20 controls the flow of data throughout system 10, manages the calculation of location, and determines the transmission of data to the available communication mode. Processor module 20 receives input of location information from location module 12 and keeps tracks of the current position, manipulates the input and output of data elements thought the communication mode, and issues commands to control the power use and system shutdown. Processor module 20 saves all the operational parameters in storage memory 102, and retrieves current position from storage 102 upon system requests.

F. Examples of Applications and Utility

The system 10 is useful for a wide variety of purposes. Listed below are some examples of its possible applications.

First, inter-continental transportation of any cargo through different vehicles, including ocean liners, trains, and trucks, can be tracked with the system 10. Currently no existing devices can provide inter-continental, multi-mode tracking capability. With the system 10, shipment of valuable commodities, environmentally sensitive materials, military equipments, and any other containers, can be monitored at all times.

Second, specially delivered packages can be tracked in real-time. Currently package delivery does not provide real-time location information for any specific package. The most commonly used tracking method in the express delivery industry is to register the arrival of a package when it reaches a specific facility. At present, if one needs to know the exact location of an expected package, the best available information is between nodes, i.e., the package has reached facility A and is en route to facility B. The preferred system 10 makes it possible to provide the exact location of any specific package at any time.

Third, system 10 is particularly useful for law enforcement agencies in covert operations. With a search warrant from the court, for example, police officers attempting to identify the whereabouts of a drug dealer may attach the system 10 under the subject's vehicle with a simple magnetic mount. Existing tracking technology has several limitations that make covert operations difficult and often times infeasible. Typically, an officer has a very limited amount of time to place the tracking device. Existing products powered by battery can only last a few days. Current wireless communication is primarily based on local radio frequencies and thus can be easily lost when the subject moves out of the coverage and disappears from the monitoring system. The system 10 solves all the current problems with the current covert tracking systems.

Fourth, the system 10 can be a life-saving device for those who participate in outdoor activities. With the system 10, a hiker who gets lost in the mountains, where cellular coverage is absent, can still be located promptly. Each member of a search crew can be equipped with the system for maximum protection of their own safety and for a more effective search.

In summary, with the system installed on any asset that needs to be shipped, the management of such assets becomes much more efficient and accurate. The manager of rental equipment can always locate items that are misplaced or lost. The above list is by no means exhaustive. Numerous other possible applications that may benefit from a durable, global asset-tracking device according to the invention.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

What is claimed is:

1. An apparatus for globally tracking assets from a central tracking facility comprising:
    a processor module;
    a location module coupled to the processor module, the location module for providing a position accuracy at all times within an approximately 20 meter radius of an actual location of the apparatus;
    a communication module coupled to the processor module, the communication module for selecting the most cost-effective, available mode of communication to the central tracking facility; and
    an antenna module coupled to the processor module and to the communication module, the antenna module comprising a plurality of antennas including a GPS antenna, at least one antenna for low frequency RF, at least one antenna for multi-band terrestrial wireless communication networks, and at least one antenna for satellite communications, each of the antennas for sending and receiving signals and an antenna controller for continuously checking for validity of signals from each of the plurality of antennas to determine availability of communications therethrough, the antenna for low frequency RF being adjustable for different frequencies of communication to maximize communication through a specific channel, the antenna for multi-band terrestrial wireless communication networks including commercial cellular networks or digital wireless networks, where exchange of information received from the GPS antenna and wireless communications through the antenna for low frequency RF, antenna for multi-band terrestrial wireless communication networks, and antenna for satellite communications occurs in the processor module.

2. The apparatus of claim 1 further comprising a power module for providing a durable source of power to the apparatus, the power module being coupled to the processor module.

3. The apparatus of claim 2 wherein the power module provides unassisted power to the apparatus for at least one year's operation.

4. The apparatus of claim 2 wherein when the power module minimizes power consumption within the apparatus whenever the apparatus is not moving as determined by the location module.

5. The apparatus of claim 2 where the power module comprises an external wakeup unit, a high energy-density battery, and a self-recharging unit.

6. The apparatus of claim 5 where the external wake-up unit further comprises a data receive sensor responsive to commands from the central facility to power up the apparatus on command therefrom.

7. The apparatus of claim 5 where self-recharging unit comprises an external recharging source, an internal recharging source, and a solar recharging source.

8. The apparatus of claim 1 wherein when the apparatus is active, the communication module continuously transfers information pertaining to the most cost-effective, available mode of communication to the processor module.

9. The apparatus of claim 1 wherein a GPS circuit of the location module comprises a GPS engine board for processing GPS data, and where the dynamic motion sensor comprises a three-dimensional gyro and a speed computation processor.

10. The apparatus of claim 9 where the three-dimensional gyro determines motion of the apparatus in three dimensions, and where the speed computation processor estimates acceleration or deceleration of the apparatus at all times.

11. The apparatus of claim 1 further comprising means for initialization a location of the apparatus.

12. The apparatus of claim 11 where the means for initialization a location of the apparatus comprises a GPS circuit within the location module.

13. The apparatus of claim 11 where the means for initialization a location of the apparatus comprises a data entry device.

14. The apparatus of claim 11 where the means for initialization a location of the apparatus comprises a device for manual entry of latitude and longitude of the apparatus at the time of initialization.

15. The apparatus of claim 11 where the location module alters initial location determined by the means for initialization a location according to direction and displacement sensed by the location module of the apparatus since its initialization to generate an estimated location.

16. The apparatus of claim 15 where the location module corrects the estimated location whenever a valid GPS signal for the apparatus can be determined by the location module.

17. The apparatus of claim 15 where the location module corrects the estimated location whenever a valid RF location signal for the apparatus can be determined by the location module.

18. The apparatus of claim 1 where the communication module comprises an RF transceiver, a multi-band radio modem for cellular or digital communications, and a dedicated modem for satellite communications, the antenna controller for coordinating and controlling the communications through the RF transceiver, multi-band radio modem, and dedicated modem to evaluate validity of communications therethrough, to determine the most cost-effective mode of communication available at each given time and to switch communication to the determined most cost-effective mode of communication.

19. The apparatus of claim 18 where the antenna controller preassigns a priority to each mode of communication.

20. The apparatus of claim 19 where the priority assigned by the antenna controller is highest for RF communications, then cellular communications, and lowest for satellite communications.

21. The apparatus of claim 20 where the priority assigned by the antenna controller to cellular communications is assigned to a plurality of cellular networks, each having a corresponding frequency range, protocol and assigned priority level.

22. The apparatus of claim 21 where the central facility transmits through the communications module a corresponding frequency range, protocol and assigned priority level for each of the plurality of cellular networks to the apparatus.

23. A method for globally tracking an asset from a central tracking facility comprising the steps of:
    providing a position accuracy at all times within approximately 20 meter radius of an actual location of the asset; selecting the most cost-effective, available mode of communication to the central tracking facility;
    sending and receiving signals among a plurality of communications modes and corresponding plurality of communication protocols;

selecting the most cost-effective, available mode of communication through a plurality of corresponding antennas including a GPS antenna, at least one antenna for low frequency RF, at least one antenna for multi-band terrestrial wireless communication networks including commercial cellular networks or digital wireless networks, and at least one antenna for satellite communications, and continuously checking for validity of signals from each of the plurality of antennas to determine availability of communications therethrough;

adjusting the antenna for low frequency RF for different frequencies of communication to maximize communication through a specific channel; and exchanging of information in a processor module received from the GPS antenna and wireless communications through the antenna for low frequency RF, the antenna for multi-band terrestrial wireless communication networks, and the antenna for satellite communications occurs.

24. The method of claim 23 further comprising the step of providing a durable source of power to the asset.

25. The method of claim 24 further comprising the step of providing unassisted power to the asset for at least one year's operation.

26. The method of claim 24 further comprising minimizing power consumption within the asset whenever the asset is not moving.

27. The method of claim 24 where providing a durable source of power to the asset comprises providing an external wake-up unit, a high energy-density battery, and a self-recharging unit.

28. The method of claim 27 further comprising the step of externally activating all functions with the asset in response to commands received by the asset from the central facility.

29. The method of claim 27 further comprising the steps of recharging the battery by means of an external recharging source, an internal recharging source, and a solar recharging source.

30. The method of claim 23 wherein the step of local dynamic motion sensing comprises the steps of using three-dimensional gyroscopic direction sensing in combination with acceleration and deceleration sensing to compute the dead-reckoning position when the GPS data is not available.

31. The method of claim 30 where the steps of using three-dimensional gyroscopic direction sensing in combination with acceleration and deceleration sensing to compute the dead-reckoning position is performed at all times.

32. The method of claim 23 further comprising the step of initialization a location of the asset.

33. The method of claim 32 where the step of initialization a location of the asset comprises the step of using GPS signals and GPS processing.

34. The method of claim 32 where the step of initialization a location of the asset comprises the step of inputting the location through a data entry device.

35. The method of claim 32 where the step of initialization a location of the asset comprises the step of manually entering the latitude and longitude of the asset at the time of initialization.

36. The method of claim 32 further comprising the step of altering the initial location according to a sensed direction and displacement of the asset since its initialization to generate an estimated location.

37. The method of claim 36 further comprising the step of correcting the estimated location whenever a valid GPS signal for the asset can be determined.

38. The method of claim 36 further comprising the step of correcting the estimated location whenever a valid RF location signal for the asset can be determined.

39. The method of claim 23 further comprising the step of preassigning a priority to each mode of communication by means of a control circuit.

40. The method of claim 39 where the step of preassigning a priority to each mode of communication assigns the highest priority for RF communications, then cellular communications, and the lowest priority for satellite communications.

41. The method of claim 40 where the step of preassigning a priority to cellular communications assigns priority to a plurality of cellular networks, each having a corresponding frequency range, protocol and assigned priority level.

42. The method of claim 41 further comprising the step of the central facility transmitting a corresponding frequency range, protocol and assigned priority level for each of the plurality of cellular networks to the asset.

43. A system for globally tracking assets comprising:
a processor module;
a location module coupled to the processor module, the location module comprising a sensor to detect movement of the system;
a communication module coupled to the processor module and adapted for communication with a remote tracking facility;
an antenna module coupled to the processor module adapted for sending and receiving signals among a plurality of antennas and corresponding plurality of communication protocols, the antenna module coupled to the processor module and to the communication module, the antenna module comprising a plurality of antennas including a GPS antenna, at least one antenna for low frequency RF, at least one antenna for multi-band terrestrial wireless communication networks, and at least one antenna for satellite communications, each of the antennas for sending and receiving signals and an antenna controller for continuously checking for validity of signals from each of the plurality of antennas to determine availability of communications therethrough, the antenna for low frequency RF being adjustable for different frequencies of communication to maximize communication through a specific channel, the antenna for multi-band terrestrial wireless communication networks including commercial cellular networks or digital wireless networks, where exchange of information received from the GPS antenna and wireless communications through the antenna for low frequency RF, antenna for multi-band terrestrial wireless communication networks, and antenna for satellite communications occurs in the processor module; and
a power module coupled to the processor module, the power module being adapted to switch between a sleep mode when the sensor does not detect movement and a wakeup mode when the sensor detects movement.

44. The system of claim 43 wherein the power module provides unassisted power to the system for at least one year's operation.

45. The system of claim 43 wherein the communication module is adapted for selecting the most cost-effective, available mode of communication with the remote tracking facility.

46. The system of claim 45 wherein the communication module selects from an RF mode, a cellular mode and a satellite mode.

47. The system of claim 46 wherein the communication module assigns a priority to each mode, the priority being highest for the RF mode, the priority being second highest for the cellular mode, and the priority being lowest for the satellite mode.

48. A system for globally tracking assets comprising:
a processor module;
a location module coupled to the processor module;
a communication module coupled to the processor module and adapted for communication to a remote tracking facility;
a plurality of antennas including a GPS antenna, at least one antenna for low frequency RF, at least one antenna for multi-band terrestrial wireless communication networks, and at least one antenna for satellite communications, each of the antennas for sending and receiving signals, the antenna for low frequency RF being adjustable for different frequencies of communication to maximize communication through a specific channel, the antenna for multi-band terrestrial wireless communication networks including commercial cellular networks or digital wireless networks, where exchange of information received from the GPS antenna and wireless communications through the antenna for low frequency RF, antenna for multi-band terrestrial wireless communication networks, and antenna for satellite communications occurs in the processor module;
an antenna module coupled to the processor module and to the communication module, the antenna module for sending and receiving signals among a the plurality of antennas in a corresponding plurality of communication protocols and comprising an antenna controller for continuously checking for validity of signals from each of the plurality of antennas to determine availability of communications therethrough; and
a power module coupled to the processor module.

49. The system of claim 48 wherein the communication protocols comprise a GPS protocol, an RF protocol, a cellular protocol, and a satellite protocol.

* * * * *